Oct. 10, 1950  A. L. LINGARD  2,524,983
ABSORPTION REFRIGERATION
Filed Dec. 28, 1944
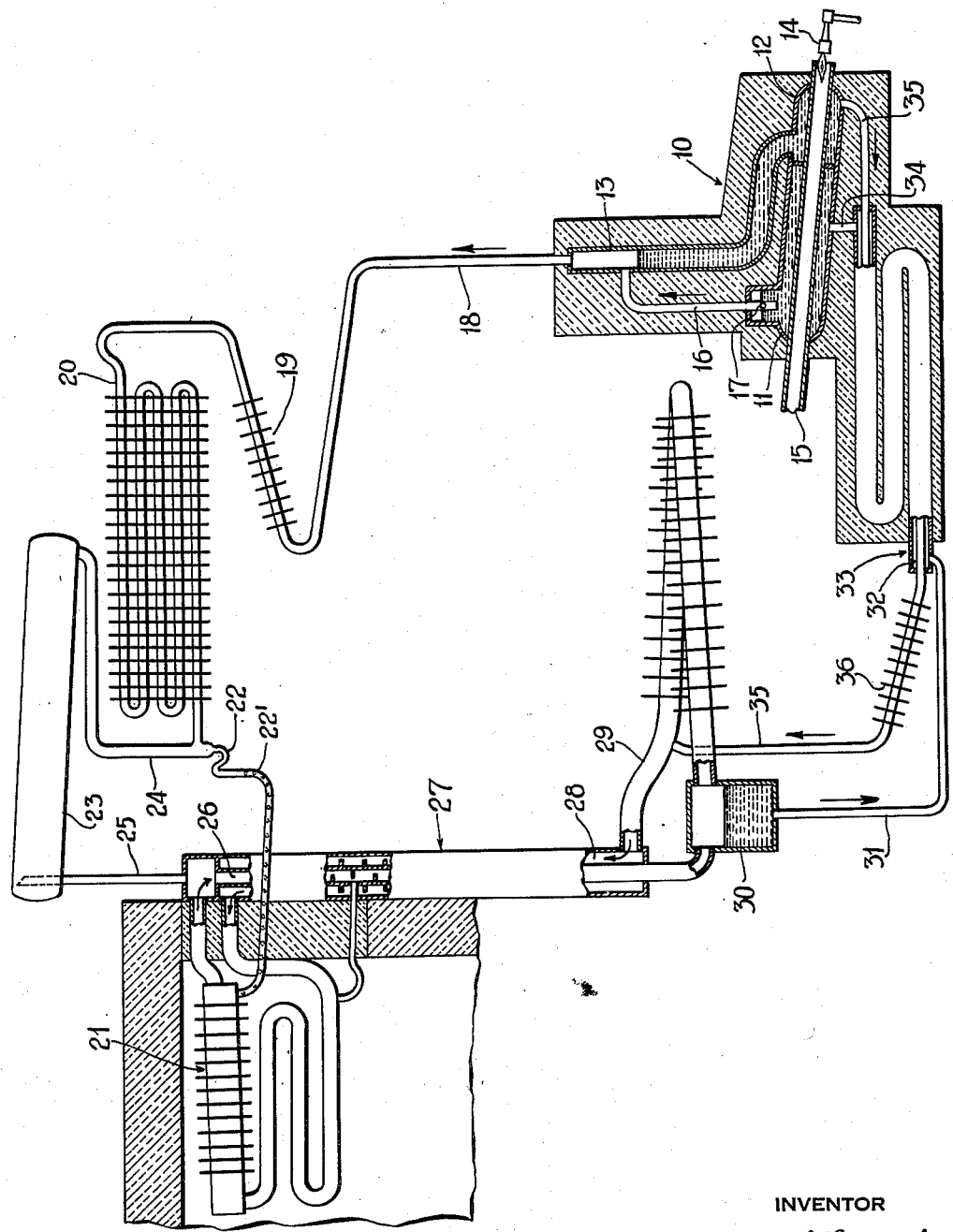
INVENTOR
Amos L. Lingard
BY
J. F. Kelly
ATTORNEY Patented Oct. 10, 1950

2,524,983

UNITED STATES PATENT OFFICE 2,524,983

ABSORPTION REFRIGERATION

Amos L. Lingard, Evansville, Ind., assignor to Servel, Inc., New York, N. Y., a corporation of Delaware Application December 28, 1944, Serial No. 570,109

4 Claims. (Cl. 62—119.5)

My invention relates to refrigeration, and particularly to absorption refrigeration of the unipressure type. More particularly, my invention relates to the circulation of a pressure-equalizing gas through the storage or pressure vessel of an absorption refrigerating system so as to maintain a low partial pressure of refrigerant vapor in said vessel during normal operation of the system.

The primary function of the pressure vessel in a refrigerating system of the unipressure type is to maintain the system under the most desirable pressure for existing ambient temperatures. At high room temperature uncondensed refrigerant vapor from the condenser displaces a pressure-equalizing gas stored in the pressure vessel and forces said gas into the system, thereby raising the total pressure in the entire system so as to condense all of the refrigerant vapor that passes through the condenser. At normal or low room temperatures, pressure-equalizing gas is returned to the pressure vessel and remains dormant therein until the room temperature again increases. The first of these processes is accomplished satisfactorily by means of refrigerant vapor from the condenser, but when it is desired to return pressure-equalizing gas to the pressure vessel, the only means available for removing refrigerant vapor from said vessel is by condensation. This sometimes leaves refrigerant vapor in the pressure vessel at its condensing pressure and thus reduces the storage capacity of the vessel for pressure-equalizing gas, which means that at certain times the pressure vessel is not being used to its fullest extent.

It is an object of my invention to provide an absorption refrigerating system of the unipressure type wherein pressure-equalizing gas is circulated through the pressure vessel during normal operation of the system.

It is another object of my invention to provide a refrigerating system as above described, wherein the pressure-equalizing gas is slowly circulated through the pressure vessel by the refrigerant fluid in its path of flow through the system.

My invention, together with its objects and advantages, is more fully set forth in the following description and accompanying drawing, wherein the single figure schematically illustrates an absorption refrigerating apparatus of the unipressure type incorporating one embodiment of my invention.

Referring now to the drawing, the refrigerating apparatus comprises a generator 10 having a rear chamber 11 and a forward chamber 12 communicating with a standpipe 13. The generator contains a body of absorption liquid such as water, having a suitable refrigerant such as ammonia in solution therein. A vapor-lift conduit 16, provided with an opening 17 in the lower portion thereof, connects generator chamber 11 with standpipe 13. A conduit 18, provided with an air-cooled rectifier portion 19, leads from the upper end of standpipe 13 and is connected to the inlet end of an air-cooled condenser 20. The discharge end of condenser 20 is connected to an evaporator 21 by means of a fall tube 22. The discharge end of condenser 20 is also connected to a pressure vessel 23 by means of a conduit 24, the lower portion of which conduit is connected to and forms the inlet of fall tube 22. Fall tube 22, as shown in the drawing, is of the siphon type. That is, slugs of liquid refrigerant accumulate in the entrance of this tube and are periodically siphoned into the vertical portion 22' of said tube. A conduit 25 connects pressure vessel 23 to the inner passage 26 of a gas heat exchanger 27.

The lower portion of evaporator 21 is connected by an outer passage 28 of the gas heat exchanger to the upper end of an air-cooled absorber 29. The upper end of the evaporator is connected by the inner passage 26 of the gas heat exchanger, and a storage vessel 30, to the lower end of absorber 29. Vessel 30 is connected to generator chamber 11 by means of a conduit 31, outer passage 32 of a liquid heat exchanger 33, and a conduit 34 which leads into the lower portion of said chamber. Generator chamber 12 is connected to the upper end of the absorber by means of a conduit 35, which forms the inner passage of liquid heat exchanger 33, and which conduit is provided with heat transfer fins 36.

In the operation of the refrigerating apparatus just described, assuming that the apparatus is charged with ammonia as the refrigerant, water as the absorbent and hydrogen as the inert pressure-equalizing gas, heat applied to the refrigerant-absorbent solution in the generator by means of the gas burner causes ammonia vapor to be expelled from the solution. Ammonia vapor and absorption liquid pass in alternation through the opening 17 in the lower part of vapor-lift conduit 16 which conducts the ammonia vapor and absorption liquid into the upper part of standpipe 13. The ammonia vapor entering the standpipe, as well as the ammonia vapor which rises through the solution in the standpipe, flows upward through conduit 18 and rectifier 19 into condenser 20. In passing through the rectifier, any water vapor that may have been expelled with the ammonia vapor is condensed and the condensate drops back into the standpipe. Assuming normal or low room temperature, the ammonia vapor passing through the condenser is substantially all condensed and the liquid ammonia passes from the outlet end of the condenser through fall tube 22 into the upper portion of the evaporator. As the liquid ammonia enters the fall tube, it traps bubbles of gas from vent conduit 24 connected to pressure vessel 23 and carries said gas bubbles along between slugs of liquid ammonia into the upper portion of the evaporator where the gas is released. Rich gas, that is, hydrogen rich in ammonia from the upper part of the evaporator, then enters the pressure vessel through vent conduit 25 to replace the gas removed from said vessel through vent conduit 24 and fall tube 22. From the above, it is seen that the slugs of liquid ammonia in passing through fall tube 22 trap bubbles of gas from vent conduit 24 which causes a circulation of gas through said conduit, fall tube, the gas outlet portion of the evaporator, vent conduit 25, pressure vessel 23, and back to conduit 24.

Liquid ammonia which enters the upper part of the evaporator flows downward therethrough in counter-flow with weak gas flowing upward therethrough and said liquid ammonia vaporizes and diffuses into the weak gas, thereby producing the desired refrigerating effect. The enriched gas passes from the upper portion of the evaporator into the inner passage of gas heat exchanger 27, through said passage, and through the upper portion of storage vessel 30 into the lower portion of absorber 29. The rich gas entering the lower portion of the absorber flows upward therethrough in intimate contact and counter-flow relation with weak absorption solution flowing into and through the absorber from conduit 35. The weak absorption solution becomes enriched in ammonia and flows into storage vessel 30, and the impoverished gas flows from the upper end of the absorber through the outer passage of gas heat exchanger 27 and into the lower portion of the evaporator. From vessel 30 the enriched absorption solution flows through conduit 31, outer passage 32 of liquid heat exchanger 33, and conduit 34 into generator chamber 11. Weak absorption solution flows from generator chamber 12 through conduit 35 into the upper end of the absorber.

Assume now that the room temperature has risen to such a point that part of the ammonia vapor which enters the condenser passes therethrough without being condensed. This uncondensed ammonia vapor flows from the outlet of the condenser into and upwardly through vent conduit 24 into pressure vessel 23, displacing pressure-equalizing gas stored in said vessel and forcing said gas through vent conduit 25 into the main gas circuit thereby raising the total pressure in the entire system. When operating under high room temperatures, part of the ammonia vapor is condensed in condenser 20, and part of it is condensed in vent conduit 24 and in pressure vessel 23. That part of the vapor which is condensed in pressure vessel 23 and in conduit 24 trickles downward from said vessel through said conduit and flows into fall tube 22 with the condensate from condenser 20. It might be stated here that the volume of gas that is trapped in fall tube 22 is relatively small, and while it does cause a slow continuous circulation of gas through the pressure vessel during normal or low room temperature operation, it has little or no appreciable effect upon the functioning of the pressure vessel during high room temperature operations.

Assume now that the room temperature has dropped to a point at which substantially all of the ammonia vapor is again condensed in condenser 20, the trapping of gas in fall tube 22 from vent conduit 24 again causes a circulation of gas through the pressure vessel and in due time the ammonia vapor that has remained in said vessel at its condensing pressure is mixed with the rich gas passing through the pressure vessel and carried along with said gas into vent conduit 24 and fall tube 22. In this manner, all of the ammonia vapor is removed from the pressure vessel and there remains only stored rich gas.

While I have illustrated and described one specific embodiment of my invention, it obviously may take other forms and be variously applied within the scope of the following claims.

What I claim is:

1. In an absorption refrigerating system of the unipressure type including a generator, a condenser, an evaporator and an absorber, a main gas circuit between said evaporator and said absorber, an auxiliary gas circuit including a pressure vessel between said condenser and said evaporator, and a fall tube for causing circulation of gas in said auxiliary gas circuit.

2. In an absorption refrigerating system of the unipressure type including a generator, a condenser, an evaporator and an absorber, a main gas circuit between said evaporator and said absorber, an auxiliary gas circuit including a pressure vessel between said condenser and said evaporator, said auxiliary gas circuit being in open communication with said main gas circuit, and means operable by flow of refrigerant fluid from said condenser to said evaporator for causing circulation of gas in said auxiliary gas circuit.

3. The method of refrigerating with the aid of a system containing a refrigerant fluid and an additional fluid for equalizing pressures which includes continuously circulating an excess of said additional fluid under normal operating conditions in an auxiliary circuit, utilizing flow of liquid refrigerant in said system to cause circulation of fluid in said auxiliary circuit, and transferring fluid from said auxiliary circuit into said system when the pressure in the latter increases.

4. The method of refrigerating with a system containing a refrigerant fluid and an additional fluid for equalizing pressures which includes continuously circulating an excess of said additional fluid under normal operating conditions in an auxiliary circuit, utilizing a force produced by flow of liquid refrigerant in said system to cause circulation of fluid in said auxiliary circuit, and transferring additional fluid from said auxiliary circuit into said system when the pressure in the latter increases.

AMOS L. LINGARD.

REFERENCES CITED

The following references are of record in the file of this patent:

UNITED STATES PATENTS

| Number | Name | Date |
|---|---|---|
| 1,996,094 | Backstrom | Apr. 2, 1935 |
| 2,072,987 | Kogel et al. | Mar. 9, 1937 |
| 2,134,996 | Bikkers | Nov. 1, 1938 |
| 2,215,674 | Ullstrand | Sept. 24, 1940 |
| 2,251,746 | Lescarbeau | Aug. 5, 1941 |